(12) United States Patent
Ogawa et al.

(10) Patent No.: US 6,630,562 B2
(45) Date of Patent: Oct. 7, 2003

(54) POLYCARBONATE RESIN

(75) Inventors: Noriyoshi Ogawa, Toyonaka (JP);
Tatsuya Kanagawa, Toyonaka (JP);
Takahiro Adachi, Toyonaka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/035,228

(22) Filed: Jan. 4, 2002

(65) Prior Publication Data

US 2002/0132959 A1 Sep. 19, 2002

(30) Foreign Application Priority Data

Jan. 16, 2001 (JP) .......................................... 2001-007462

(51) Int. Cl.$^7$ ............................................... C08G 64/00
(52) U.S. Cl. ........................... 528/196; 528/198; 528/10
(58) Field of Search ................................ 528/196, 198, 528/10

(56) References Cited

U.S. PATENT DOCUMENTS 5,916,980 A      6/1999   Ogawa et al.
6,340,737 B2 *   1/2002   Ogawa et al. .............. 528/196

FOREIGN PATENT DOCUMENTS

| EP | 1 097 956 A1 | 5/2001 |
| EP | 1 138 714 A2 | 10/2001 |
| JP | 7-165897 | 6/1995 |
| JP | 8-134198 | 5/1996 |
| JP | 10-158379 | 6/1998 |

* cited by examiner

*Primary Examiner*—Terressa M. Boykin
(74) *Attorney, Agent, or Firm*—Sughrue Mion, PLLC

(57) ABSTRACT

A polycarbonate resin obtained by reaction of (A) a bisphenol compound having a fluorene structure and (B) a compound having a polysiloxane structure with hydroxyphenyl group or (A) a bisphenol compound having a fluorene structure, (B) a compound having a polysiloxane structure with hydroxyphenyl group and (C) other specific bisphenol compound with a carbonic acid ester-forming compound, wherein an amount of (B) bisphenol compound is 10 to 50% by weight to total amount of (A) a bisphenol compound having a fluorene structure, (B) a compound having a polysiloxane structure with hydroxyphenyl group and (C) other specific bisphenol compound and an intrinsic viscosity of said polycarbonate resin is 0.2 to 2.0 dl/g.

9 Claims, No Drawings

POLYCARBONATE RESIN

BACKGROUND OF THE INVENTION

1) Field of the Invention

The present invention relates to a polycarbonate resin with good moldability and good transparency and furthermore excellent abrasion resistance and excellent weather resistance. The polycarbonate resin is applicable to uses of general molding of various materials such as medical instrument parts, food vessels, drinking bottles, gas permeation membranes, binders for dye and pigment, toys, materials for window and building, safeguarding materials, office automation apparatuses and portable telephones and boxes, and particularly, suitable to the production of optical articles such as optical discs including compact disc, laser disc, optical card, magneto optical disc, digital versatile disc and near field recording optical disc, optical lenses including pick-up lens, spectacle lens and camera lens, optical films and optical sheets including cover layer for near field recording medium and optical filter, optical information transmission media including optical fiber and optical waveguide and photoconductive boards.

2) Prior Art

Now, a majority of polycarbonate resins which have been produced is a bisphenol A type polycarbonate used 2,2-bis (4-hyroxylphenyl) propane (so-called "bisphenol A") as a raw material. The bisphenol A type polycarbonate resin is a polycarbonate resin with good balance of cost, heat resistance and mechanical strength. Recently, a polycarbonate resin with more excellent properties has been desired with extension of the range of its use. Thus, polycarbonate resins having various structures have been developed. However, a polycarbonate with more excellent properties or more particular properties has been required from the market. Thus, development of novel polycarbonate has been necessitated.

As one of them, a siloxane copolymerization polycarbonate as a modified polycarbonate improved mold releasing and flowability has been developed (Japanese Patent Kokai (Laid-open) Nos. 50-29695, 3-079626, 5-155999, 7-258398 and 7-165897).

Further, also a graft type siloxane copolymerization polycarbonate and a resin composition thereof having more excellent abrasion resistance than the above-mentioned siloxane copolymerization polycarbonate have been developed (Japanese Patent Kokai (Laid-open) Nos. 10-158379 and 10-158499).

On the other hand, also a polycarbonate improved abrasion resistance and dust proof has been developed by using a polycarbonate having a particular fluorene structure (not slipping of silicone chain) (Japanese Patent Kokai (Laid-open) No. 8-134198).

Although the above-mentioned polycarbonates exhibited excellent abrasion resistance under ordinary conditions, abrasion resistance after severe environmental tests such as outdoor exposure was not sufficient, so that it was a room for further improvement.

Further, the above-mentioned polycarbonates were used in a wet molding, non-halogen solvents came to be used as a solvent from the aspect of environmental problems. Thus, also a polycarbonate with good solubility to non-halogen solvents such as tetrahydrofuran has been required.

SUMMARY OF THE INVENTION

From the viewpoint of the above-mentioned situation, an object of the present invention is to provide a polycarbonate resin with both excellent weather resistance and excellent abrasion resistance which dissolves in non-halogen solvents.

As a result of extensive studies to solve above-mentioned prior art problems, the inventors have found that a polycarbonate resin having a particular fluorene structure and a particular graft polysiloxane structure in a repeating unit exhibits both excellent weather resistance and excellent abrasion resistance and dissolves in non-halogen solvents, and accomplished the present invention.

The present invention provides a polycarbonate resin obtained by reaction of a compound represented by the following general formula (A) and a compound represented by the following general formula (B) or a compound represented by the general formula (A), a compound represented by the formula (B) and a compound represented by the following general formula (C) with a carbonic acid ester-forming compound, wherein an amount of a compound represented by the general formula (B) is 10 to 50% by weight to total amount of a compound represented by the general formula (A), a compound represented by the general formula (B) and a compound represented by the general formula (C) and an intrinsic viscosity [η] of said polycarbonate resin is 0.2 to 2.0 dl/g;

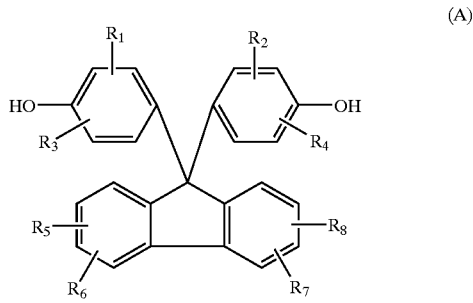

(A)

wherein $R_1$, $R_2$, $R_3$, $R_4$, $R_5$, $R_6$, $R_7$ and $R_8$ are, each independently, a hydrogen atom, an alkyl group having 1 to 5 carbon atoms, an aryl group having 6 to 12 carbon atoms, an alkenyl group having 2 to 5 carbon atoms, an alkoxy group having 1 to 5 carbon atoms or an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s);

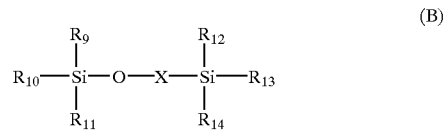

(B)

wherein $R_9$, $R_{10}$, $R_{11}$, $R_{12}$, $R_{13}$ and $R_{14}$ are, each independently, a hydrogen atom, an alkyl group having 1 to 5 carbon atoms, an aryl group having 6 to 12 carbon atoms, an alkenyl group having 2 to 5 carbon atoms, an alkoxy group having 1 to 5 carbon atoms or an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s); X is a homopolymer or a random copolymer of —SiO($R_{15}$)($R_{16}$)— and/or —SiO($R_{17}$)($R_{18}$)— having an average polymerization degree of 3 to 200; $R_{15}$, $R_{16}$, $R_{17}$ and $R_{18}$ are, each independently, a hydrogen atom, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms or an organic group (M) having an hyroxyphenyl group and when said group has carbon atom, said group can have an alkyl group having 1 to 5 carbon atoms, an alkenyl group having 2 to 5 carbon atoms or an alkoxy group having 1 to 5 carbon atoms as a substituent(s) and average 1 to 3 organic group (M) having an hyroxyphenyl group is (are) indispensably contained in $R_{15}$, $R_{16}$, $R_{17}$ and $R_{18}$;

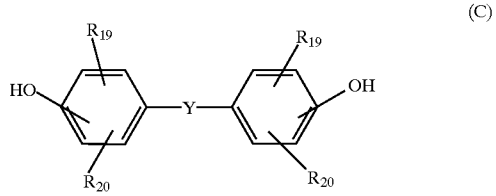

(C)

wherein $R_{19}$ and $R_{20}$ are, each independently, a hydrogen atom, a fluorine atom, a chlorine atom, a bromine atom, an alkyl group having 1 to 10 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms or a group forming a carbon ring or a heterocycle in optional combination of $R_{19}$ and $R_{20}$ and when said group has carbon atom, said group can have a fluorine atom, a chlorine atom, a bromine atom, an alkyl group having 1 to 5 carbon atoms, an alkenyl group having 2 to 5 carbon atoms or an alkoxy group having 1 to 5 carbon atoms as a substituent(s) and Y is;

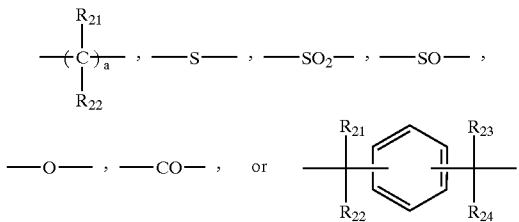

wherein $R_{21}$, $R_{22}$, $R_{23}$ and $R_{24}$ are, each independently, a hydrogen atom, a fluorine atom, a chlorine atom, a bromine atom, an alkyl group having 1 to 10 carbon atoms, an alkenyl group having 2 to 5 carbon atoms, an alkoxy group having 1 to 5 carbon atoms, an aryl group having 6 to 12 carbon atoms, a carbon ring having 3 to 6 carbon atoms or a heterocycle having 3 to 6 carbon atoms in optional combination of $R_{21}$, $R_{22}$, $R_{23}$ and $R_{24}$ and when said group has carbon atom, said group can have a fluorine atom, a chlorine atom, a bromine atom, an alkyl group having 1 to 5 carbon atoms, an alkenyl group having 2 to 5 carbon atoms or an alkoxy group having 1 to 5 carbon atoms as a substituent(s) and a is an integer of 0 to 20.

Further, the present invention provides a polycarbonate resin composition comprising of a mixture of the above-mentioned polycarbonate resin and a polyorganosiloxane.

DETAILED DESCRIPTION OF THE INVENTION

The invention will be described in detail below.

The polycarbonate resin of the present invention can be produced by reaction of the compound represented by the above-mentioned general formula (A) (hereinafter, "compound of formula (A)") and the compound represented by the above-mentioned general formula (B) (hereinafter, "compound of formula (B)") or the compound of formula (A), the compound of formula (B) and the compound represented by the above-mentioned general formula (C) (hereinafter, "compound of formula (C)) with a carbonic acid ester-forming compound.

Known processes for producing a polycarbonate resin to be derived from bisphenol A, e.g., a process comprising a direct reaction between bisphenols and phosgene (phosgene process) or a process comprising transesterification between bisphenol and a bisaryl carbonate (transesterification process) can be applied to the process for producing the polycarbonate resin of the present invention.

Among the phosgene process and the transesterification process, it is preferable to apply the phosgene process, considering reactivity between the compound of formula (A) and the compound of formula (B).

In the former phosgene process, the reaction of the compound of formula (A) and the compound of formula (B) or the compound of formula (A), the compound of formula (B) and the compound of formula (C) and phosgene is performed usually in the presence of an acid bonding agent and a solvent.

Examples of the acid bonding agent include pyridine and alkali metal hydroxides including sodium hydroxide and potassium hydroxide.

Examples of the solvent include methylene chloride, chloroform, chlorobenzene and xylene.

Further, in order to promote polycondensation, a catalyst including tertiary amines such as triethylamine is added. In order to adjust polymerization degree, monofunctional compounds including phenol, p-t-butyl phenol and p-cumyl phenol alkyl-substituted phenols, hydroxy benzoic acid alkyls, and alkyloxy phenols are added as molecular weight modifier.

If necessary, a small amount of antioxidants including sodium sulfite and hydrosulfite and a small amount of branching agents including phloroglucine, isatin bisphenol, 1,1,1-tris(4-hydroxyphenyl) ethane and α, α', α"-tris(4-hydroxyphenyl)-1,3,5-triisopropyl benzene may be added.

The reaction temperature is usually in the range of 0 to 150° C. and preferably in the range of 5 to 40° C. The reaction time is usually 0.5 minutes to 10 hours and preferably 1 minute to 2 hours, depending on the reaction temperature. It is preferable to maintain pH of the reaction system to 10 or above during the reaction.

In the latter transesterification process, a mixture of the compound of formula (A) and the compound of formula (B) or the compound of formula (A), the compound of formula (B) and the compound of formula (C) and bisaryl carbonate is reacted under a reduced pressure at a high temperature. In this reaction, a monofunctional compound(s) including phenol, p-t-butyl phenol, p-cumyl phenol alkyl-substituted phenols, hydroxy benzoic acid alkyls and alkyloxy phenols may be added as molecular weight modifier.

The reaction is performed usually at a temperature of 150 to 350° C. and preferably 200 to 300° C. Phenols by-produced by transesterification and derived from bisaryl carbonate are distilled off preferably under a final reduced pressure degree of 1 mmHg or below outside the reaction system. The reaction time is usually about 1 to 6 hours, depending on the reaction temperature or the reduced pressure degree. It is preferable to perform the reaction under the atmosphere of an inert gas such as nitrogen, argon, etc. In the reaction, if necessary, an antioxidant(s) and a branching agent(s) may be added.

Examples of the compound of formula (A) include 9,9-bis(4-hydroxy-2-methylphenyl) fluorene, 9,9-bis(4-hydroxy-3-methylphenyl) fluorene, 9,9-bis(4-hydroxyphenyl) fluorene, 3,6-dimethyl-9,9-bis(4-hydroxyphenyl) fluorene, 9,9-bis(3-methoxy-4-hydroxyphenyl) fluorene, 9,9-bis(3-ethoxy-4-hydroxyphenyl) fluorene, 9,9-bis(3-ethyl-4-hydroxyphenyl) fluorene, 4,5-dimethyl-9,9-bis(4-hydroxyphenyl) fluorene, 9,9-bis(3-phenyl-4-hydroxyphenyl) fluorene, 3,6-dimethyl-9,9-bis(3-methyl-4-hydroxyphenyl) fluorene and 3,6-diphenyl-9,9-bis(4-hydroxyphenyl)fluorene. Among them, 9,9-bis(4-hydroxyphenyl)fluorene, 9,9-bis(4-hydroxy-3-methylphenyl) fluorene and 9,9-bis(4-hydroxy-2-methylphenyl) fluorene are preferable. A combination of two species of the compounds thereof or above may be used.

The polysiloxane compound having a hyroxyphenyl group represented by the above-mentioned general formula (B) (hereinafter, "polysiloxane compound of (B)) is produced by a process for production based on known hydrosililation reaction, e.g., a process for performing addition reaction of phenol with an unsaturated group(s) and a polysiloxane with Si—H group in the presence of a hydrosilliation catalyst.

The catalyst for hydrosililation may a homogenous catalyst or a heterogeneous catalyst. Examples of the catalyst for hydrosililation include platinum complex including, typically, platinum acid chloride, metal platinum, octacarbonyl dicobalt, palladium complex and rhodium complex.

The reaction is performed in a solvent able to dissolve unsaturated group-containing phenols to be used in the present invention.

Examples of the solvent include halogenated hydrocarbons such as carbon tetrachloride, chloroform. 1,2-dichloroethane, aromatic hydrocarbons such as benzene, toluene and xylene, aromatic halogenides such monochlorobenzene and dichlorobenzene, methylethyl ketone, ethyl acetate, 1,4-dioxane and cyclohexanone, among which aromatic hydrocarbons such as benzene, toluene and xylene are preferable from the aspects of solubility or compatibility with the catalyst. It is preferable that the reaction temperature is 60 to 150 ° C.

The above-mentioned Si—H group-containing polysiloxane can be derived from polyalkylhydrogensiloxane, polyarylhydrogensiloxane or polyalkylarylhydrogensiloxane. Examples of Si—H group-containing siloxane include polymethylhydrogensiloxane, polyethylhydrogensiloxane, polyphenylhydrogensiloxane and polymethylphenylhydrogensiloxane and a combination of two species thereof or above.

In the polysiloxane compound of (B), average 1 to 3 phenol (hydroxyphenyl group) added in the above-mentioned reaction per 1 molecule of polysiloxane has been added. The hydroxyphenyl group thus added reacts a carbonic acid ester-forming compound to form a carbonate bond. When the hydroxyphenyl group is below average 1 per 1 molecule of polysiloxane, unreactive polysiloxane having no added hydroxyphenyl group is increased, whereas above average 3, polysiloxane becomes a strong branching agent, so that solvent insoluble polycarbonate copolymer having a rubbery 3-dimension network structure is readily produced and its molding and its handling becomes difficult. Further, the average polymerization degree of X in the general formula (B) is preferable 3 to 200 and more preferably 5 to 100. When the polymerization degree is below 3, satisfactory characteristics of polysiloxane cannot be secured. When it is above 200, it is not preferable since reactivity with other phenols is lowered.

Examples of phenol having an unsaturated group(s) to react the above-mentioned polysiloxane having a Si—H group include o-allyl phenol, eugenol, isoeugenol, p-isopropenyl phenol, p-hydroxystyrene, p-allyl phenol, 2,6-dimethyl-4-allyl phenyl, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, p-hydroxy methyl cinnamate, 2-hydroxystilbene and 4-(1-butenyl)phenol, among which o-allyl phenol and eugenol are preferable from the aspects of easiness in handling, industrial usefulness and reactivity, Examples of polysiloxane compound of (B) include below compounds, but are not limited to below compounds.

The following diorganosiloxane units;

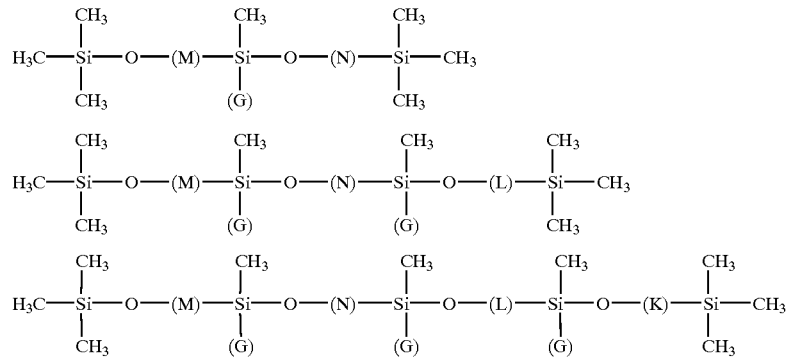

-continued

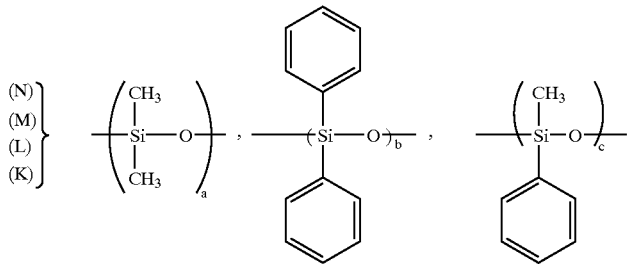

wherein a, b and c represent average polymerization degree and total of a, b and/or c is an integer of 0 or above and below 200.

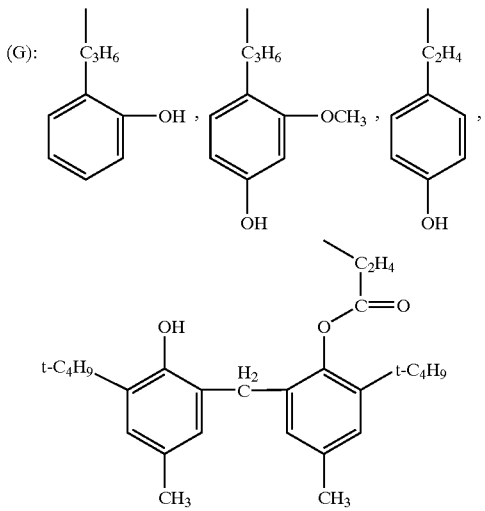

wherein (G) is an organic group having the above-mentioned hyroxyphenyl group and average 1 to 3 of the organic group per 1 molecule of polysiloxane is contained.

The above-mentioned polysiloxane compound can be used in combination of two species thereof or above.

In the hydroxyphenyl group added to the polysiloxane, average 1 to 3 hydroxyphenyl group per 1 molecule of polysiloxane has been merely theoretically added, For example, there is a possibility that 0 or 10 hydroxyphenyl group is (are) present. That is, in the present invention, the addition of average 1 to 3 hydroxyphenyl group per 1 molecule of polysiloxane means that a center value in distribution of addition number of the hydroxyphenyl group is 1 to 3. Further, addition position of the hydroxyphenyl group cannot be specified. The hydroxyphenyl group may be added to any of side chains in X of the general formula (B).

Examples of the compound of formula (C) include 4,4'-biphenyl diol, bis(4-hydroxyphenyl) methane, bis(4-hydroxyphenyl) ether, bis(4-hydroxyphenyl) sulfone, bis(4-hydroxy-3-methylphenyl) sulfone, bis(4-hydroxyphenyl) sulfoxide, bis(4-hydroxyphenyl) sulfide, bis(4-hydroxyphenyl) ketone, 1,1-bis(4-hydroxyphenyl) ethane, 2,2-bis(4-hydroxyphenyl) propane (bisphenol A;BPA), 2,2-bis(4-hydroxyphenyl) butane, 1,1-bis(4-hydroxyphenyl) cyclohexane (bisphenol Z;BPZ), 2,2-bis(4-hydroxy-3-methylphenyl) propane (dimethyl bisphenol A), 2,2-bis(4-hydroxy-3,5-dimethylphenyl) propane, 1,1-bis(4-hydroxyphenyl)-1-phenylethane(bisphenol AP;BPAP), bis(4-hydroxyphenyl) diphenylmethane, 2,2-bis(4-hydroxy-3-allylphenyl) propane, 3,3,5-trimethyl-1,1-bis(4-hydroxyphenyl) cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl) propane, 2,2-bis(4-hydroxyphenyl) hexafluoropropane, 4,4'-[1,3-phenylene(1-methylethylidene)]bisphenol, 4,4'-[1,4-phenylene(1-methylethylidene)]bisphenol and 1,1'-bi-2-naphthol. A combination of two species of above-mentioned compounds or above may be used. Among them, particullarly, 2,2-bis(4-hydroxyphenyl) propane is preferable.

Examples of the carbonic acid ester-forming compound include phosgene and bisaryl carbonates such as diphenyl carbonate, di-p-tolyl carbonate, phenyl-p-tolyl carbonate, di-p-chlorophenyl carbonate and dinaphthyl carbonate and a combination of two species of the compounds thereof or above.

When the phosgene process is applied to the present invention, it is possible to inject phosgene in the presence of a tetraammonium salt in order to perform efficiently the reaction. Examples of tetraammonium salt include tetramethylammonium chloride, trimethylbenzylammonium chloride, triethylbenzylammonium chloride, tetraethylammonium bromide and tetra-n-butylammonium iodide, among which trimethylbenzylammonium chloride and triethylbenzylammonium chloride are preferable. It is preferable that the amount of tetraammonium salt is usually 0.0005 to 5 mol % to total amount of bisphenols to be used.

Examples of tertiary amine catalyst to be applied to the phosgene process include trimethylamine triethylamine, tributylamine, tripropylamine, trihexylamine, tridecylamine, N,N-dimethylcyclohexylamine, pyridine, quinoline and dimethylaniline, among which triethylamine is preferable. It is preferable that the amount of the catalyst is 0.0005 to 10 mol % to total amount of bisphenols.

Further, when a molecular weight modifier is used in the present invention, mohydric phenol is preferable. Examples of the molecular weight modifier include phenol, alkyl-substituted phenols including butyl phenol, octyl phenol, nonyl phenol, decanyl phenol, tetradecanyl phenol, heptadecanyl phenol and octadecanyl phenol; alkyl hydroxy benzoates including butyl hydroxy benzoate, octyl hydroxy benzoate, nonyl hydroxy benzoate, decanyl hydroxy benzoate and heptadecanyl hydroxy benzoate; alkyloxy phenols including butoxy phenol, octyloxy phenol, nonyloxy phenol, decanyloxy phenol, tetradecanyloxy phenol, heptadecanyloxy phenol and octadecanyloxy phenol. The amount of the molecular weight modifier is 0.1 to 50 mol % and preferably 0.5 to 10 mol % to total amount of bisphenols.

The polycarbonate resin thus synthesized can be molded by known molding methods including extrusion molding, injection molding, blow molding, compression molding and wet molding. In the molding of a film or a sheet having abrasion resistance, it is preferable that wet molding or extruded film molding is applied. It is preferable that the intrinsic viscosity [η] of the polycarbonate resin is in the range of 0.2 to 2.0 dl/g as the range in which molding is readily performed. Particularly, when extruded film molding is performed, it is preferable that it is in the range of 0.2 to 1.0 dl/g from the viewpoint of flowability.

When a wet molding method is selected, any substance with proper volatility to dissolve the polycarbonate resin of the present invention can be used as a solvent. Examples of the solvent include cyclic ether solvents such as tetrahydrofuran and 1,4-dioxane, hydrocarbon solvents such as toluene and xylene, cyclic ketone solvents such as cyclopentanone and cyclohexanone and halogen solvents such as dichloromethane and chloroform. Recently, non-halogen solvents are often used from the aspect of environmental problems, among which tetrahydrofuran with a low boiling point is particularly often used. Also in the polycarbonate resin and the polycarbonate resin composition of the present invention, tetrahydrofuran exhibits the feature of good dissolubility.

It is preferable that the amount of the compound of formula (B) is 10 to 50% by weight to total amount of the compound of formula (A), the compound of formula (B) and the compound of formula (C), considering strength and transparency of the mold article. When the amount of the compound of formula (B) is below 10% by weight, the effect in abrasion resistance is deteriorated, whereas above 50% by weight strength is decreased, so that the molded article becomes rubbery.

When the the compound of formula (C) is used, it can be used in the range not to impair remarkably performances to be required. It is preferable that the amount of the compound of formula (C) is 50% by weight or below to total mount of the compound of formula (A) and the compound of formula (C).

It is preferable that the polycarboante resin is highly purified in the same manner as in conventional polycarbonate for optical disc. In detail, it is purified so as to satisfy as much as possible criterions including dusts of diameter 50 μm or above: substantially undetected, dusts of diameter 0.5 to 50 μm: 3×10$^4$ or below, inorganic and organic residual chloride: 2 ppm or below, residual alkali metal: 2 ppm or below, residual hydroxyl group: 200 ppm or below, residual nitrogen content: 5 ppm or below and residual monomer: 20 ppm or below. Post treatments such as extraction for removal of low molecular weight substances and removal of a solvent are sometimes performed.

Regarding the compound of formula (A), the compound of formula (B), the compound of formula (C) and a carbonic ester-forming compound as raw materials, it is preferable to use materials reduced impurities and isomers as much as possible.

In the polycarbonate resin of the present invention, in order to ensure stability and mold releasing be required during extrusion molding or injection molding, if necessary, antioxidants such as hindered phenols and phosphates; lubricants and mold releasing agents including fatty acid esters, fatty acids, fatty acid glycerides and natural fats and oils including bees wax; light stabilizers such as benzotriazoles, benzophenones, dibenzoyl methane and salicylates and antistatic agents such as polyalkylene glycols and fatty acid glycerides may be used together with the polycarbonate resin.

Further, in order to reduce cost and recycle, a mixture of the polycarbonate resin with an ordinary polycarbonate resin(s) other than the polycarbonate resin may optionally be used within the range not to impair performances. Particularly, abrasion resistance is sometimes further improved by adding 0.1 to 30% by weight of polyorganosiloxane.

In the polycarbonate resin composition of the present invention, examples of polyorganosiloxane to be added to the polycarbonate resin of the present invention include polydialkylsiloxane, polydiarylsiloxane and polyalkylarylsiolxane. In more detail, polyorganosiloxane represented by the below general formula (D) is exemplified. The above-mentioned compounds may be used in combination of two species thereof or above.

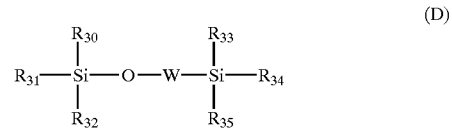

(D)

wherein $R_{30}$, $R_{31}$, $R_{32}$, $R_{33}$, $R_{34}$ and $R_{35}$ are, each independently, a hydrogen atom, an alkyl group having 1 to 5 carbon atoms, an aryl group having 6 to 12 carbon atoms, an alkenyl group having 2 to 5 carbon atoms, an alkoxy group having 1 to 5 carbon atoms or an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s); W is a homopolyer or a random copolymer of —SiO($R_{36}$)($R_{37}$)— and/or —SiO($R_{38}$)($R_{39}$)— having an average polymerization degree of 3 to 200; $R_{36}$, $R_{37}$, $R_{38}$ and $R_{39}$ are, each independently, a hydrogen atom, an alkyl group having 1 to 5 carbon atoms, an aryl group having 6 to 12 carbon atoms, an alkenyl group having 2 to 5 carbon atoms, an alkoxy group having 1 to 5 carbon atoms or an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s).

The polyorganosiloxane in the present invention means a homopolymer and does not include copolymers with polycarbonate.

The number average molecular weight of the polyorganosiloxane in the present invention is in the range of 200 to 100,000 and preferably in the range of 350 to 10,000.

As methods for blending the polycarbonate resin of the present invention and polyorganosiloxane, a method for blending during production of the polycarbonate resin, a method for blending in a polycarbonate resin liquid, a method for blending in a polycarbonate resin powder and a method for blending in a heat molten polycarbonate resin can be selected. Among them, particularly, a method for blending polyorganosiloxane during production (polymerization) of the polycarbonate resin is preferable since good dispersion is obtained and the largest effect in improvement of transparency is exhibited.

PREFERRED EMBODIMENT OF THE INVENTION

The present invention will be described in more below, referring to Examples, which are not intended to limit the scope of the present invention.

Each properties were measured according to the following methods.

Measurement Method For Intrinsic Viscosity [η]

Intrinsic viscosity [η] [dl/g] was measured for a polycarbonate resin solution of 0.5 g/dl concentration in methylene chloride solvent at Huggins's constant of 0.45 at a temperature of 20° C.

Preparation of Cast Film

A polycarbonate powder was dissolved in tetrahydrofuran, whereby a 15 w/v % polycarbonate tetrahydrofuran solution was prepared. The polycarbonate solution thus obtained was coated on a glass substrate with a film applicator and dried to remove the solvent and then taken off from the substrate, whereby a polycarbonate resin cast film of thickness about 150 μm was prepared.

Preparation of Extruded Film

A polycarbonate powder was melt extruded at 320° C. with a kneading small amount extruder, provided with a roller, manufactured by Imoto Seisakusho k.k, in Japan and then was heat rolled at 100° C., whereby a polycarbonate resin extruded film of thickness about 250 μm was prepared.

Weather Resistance Test Method

Weather resistance test in a cycle of 70° C. and 120 minutes for a cast film specimen and a rolled film specimen was performed for 48 hours in a sun shine weather meter, WEL-SUN-DC, manufactured by Suga Shikenki k.k., in Japan.

Abrasion Loss Measurement Method

Taber abrasion resistance test for a cast film specimen and a rolled film specimen before and after weather resistance test was performed for 24 hours under a load of 1000 g, in CS-17 ring.

EXAMPLE 1

76 g of 9,9-bis(4-hydroxy-3-methylphenyl) fluorene (hereinafter "BCFL") and 0.1 g of hydrosulfite were dissolved in 600 ml of 8.8 w/v % sodium hydroxide aqueous solution. 400 ml of methylene chloride and 0.1 g of triethylbenzyl ammonium chloride were added thereto and then 34 g of phosgene was injected at the rate of 1 g/min while maintaining 15° C.

After the completion of injection, 51 g of a compound having the below structure as main component (hereinafter, "Si1") was added thereto and vigorous stirring was continued for 10 minutes. Then, 0.2 ml of triethylamine was added thereto and polymerization was performed for about one hour with stirring.

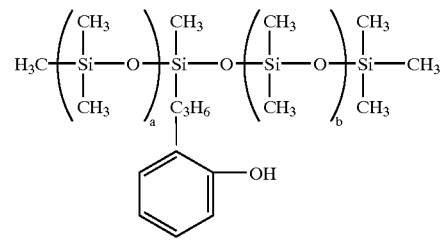

a+b=average 39 average 1.2 phenol group per 1 molecule

The polymer liquid was separated into an aqueous phase and an organic phase. The organic phase was neutralized with phosphoric acid. Water washing was repeated until an electrical conductivity of the washed liquid became 10 μS/cm or below, thus obtaining a purified resin liquid. The purified resin liquid thus obtained was slowly added in drop wise to hot water maintained to 60° C. under intense stirring, and the polymer was solidified while removing the solvent. The solid substance thus obtained was filtered and dried, whereby a white powdery polymer was obtained.

The intrinsic viscosity [η] of the polymer was 0.45 dl/g.

The polymer was analyzed by infrared absorption spectrum. Absorption due to carbonyl group near 1770 cm$^{-1}$ and absorption due to ether bond near 1240 cm$^{-1}$ were detected. It was confirmed that the polymer had carbonate bond. Absorption due to hydroxyl group at the position of 3650 to 3200 cm$^{-1}$ was almost never detected.

Thus, it was confirmed that the polymer was a polycarbonate having the below structural units.

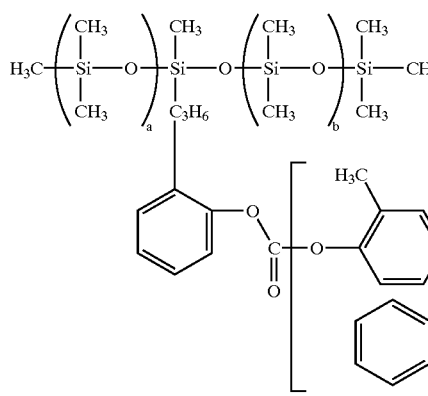

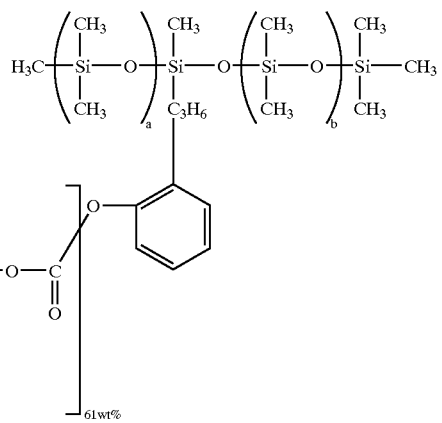

61wt%

A portion of the polycarboante powder thus obtained was dissolved in tetrahydrofuran (hereinafter "THF") to prepare a 15 w/v% solution, then preparing a cast film. The remained portion of the polycarbonate resin powder was extruded at 320° C. with a kneading extruder, provided with a stretching roller to obtain a strand and then an extruded film was prepared with a stretching roller. The molded films thus obtained were a light yellow transparent film.

Weather resistance test for the molded films was performed for 48 hours. Abrasion resistance before and after the test was evaluated.

EXAMPLE 2

The experiment was performed in the same manner as in Example 1 except that 51 g of a compound having the below structure as main component (hereinafter "Si2") was used instead of Si1 and 2.0 g of p-t-butyl phenol (hereinafter "PTBP") was charged in charge of Si2.

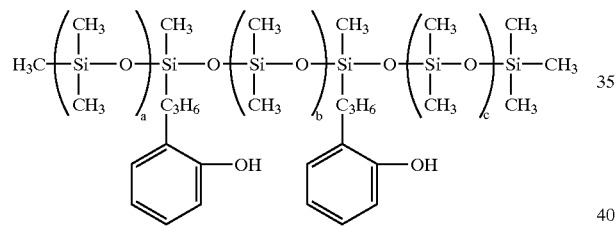

a+b+c≈average 38 average 2 phenol group per 1 molecule

The intrinsic viscosity [η] of the polymer was 0.58 dl/g.

It was confirmed that the polymer was a polycarbonate having the below structural units from infrared absorption spectrum analysis.

EXAMPLE 3

The experiment was performed in the same manner as in Example 1 except that 51 g of a compound having the below structure as main component (hereinafter "Si3") was used instead of Si1 and 4.8 g of PTBP was charged in charge of Si3.

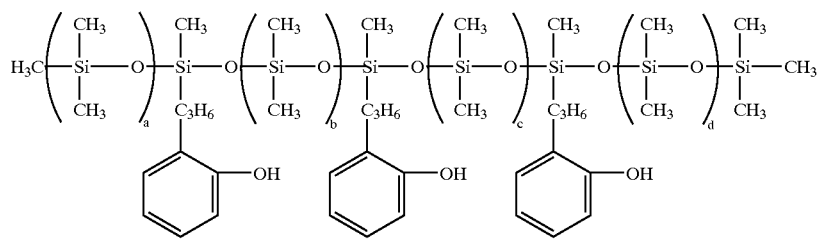

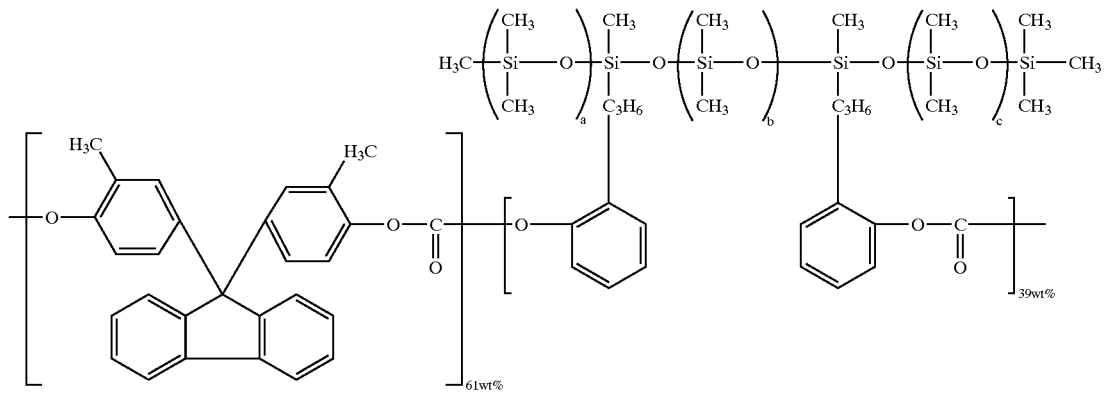

60:40 (wt %) in monomer ratio a+b+c+d≈average 37 average 2.6 phenol group per 1 molecule

The intrinsic viscosity [η] of the polymer thus obtained was 0.54 dl/g.

It was confirmed that the polymer was a polycarbonate having the below structural units from infrared absorption spectrum analysis.

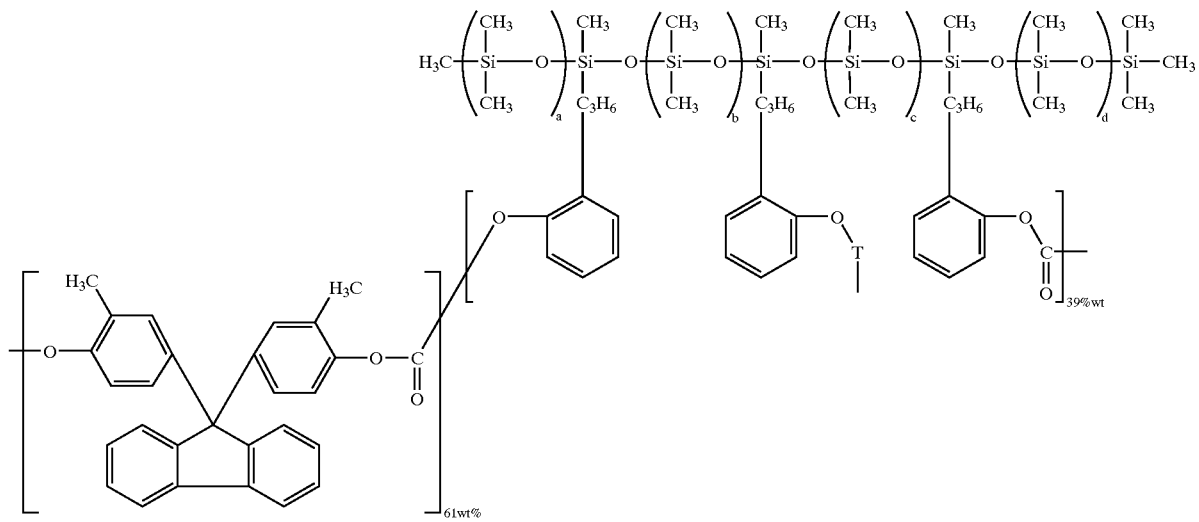

T: direct bond or C=O

60:40 (wt %) in monomer ratio

EXAMPLE 4

The experiment was performed in the same manner as in Example 1 except that the amount of BCFL was changed to 63.5 g and the amount of Si1 was changed to 38.1 g and 25.4 g of 2 2-bis(4-hyroxyphenyl)propane (hereinafter "BPA") was added simultaneously together with BCFL and 0.7 g of PTBP was added simultaneously together with Si1.

The intrinsic viscosity [η] of the polymer thus obtained was 0.44 dl/g.

It was confirmed that the polymer was a polycarbonate having the below structural units from infrared absorption spectrum analysis.

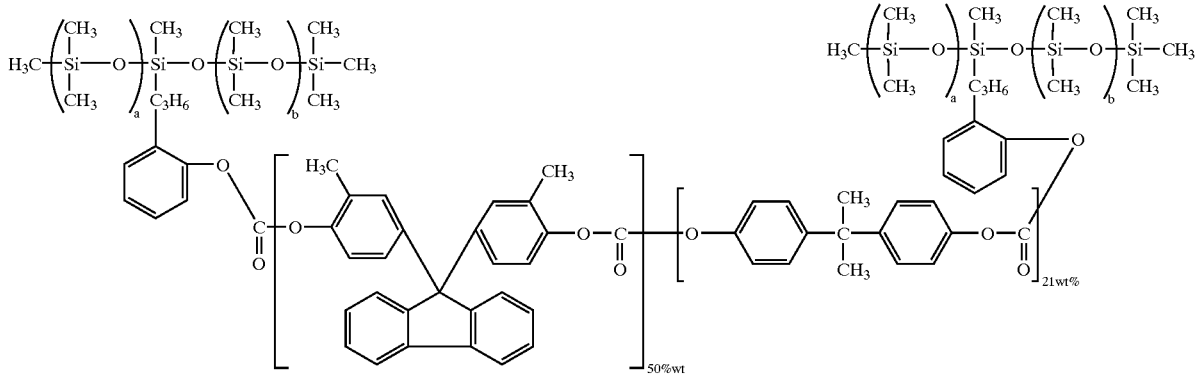

50:20 (wt %) in monomer ratio

EXAMPLE 5

The experiment was performed in the same manner as in Example 1 except that the amount of BCFL was changed to 89 g and the amount of Si1 was changed to 38 g and 3.8 g of polyorganosiloxane having the below structure (hereinafter "SD1") was added simultaneously together with Si1.

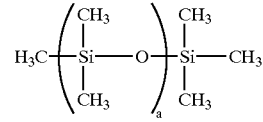

a≈average 40

The intrinsic viscosity [η] the polymer mixture thus obtained was 0.53 dl/g,

It was confirmed that the polymer mixture was a mixture of a polycarbonate having the same structure as in Example 1 except copolymerization ratio and SD1 from infrared absorption spectrum analysis.

EXAMPLE 6

The experiment was performed in the same manner as in Example 1 except that the amount of BCFL was changed to 82.6 g and 44.4 g of a compound having the below structure as main component (hereinafter "Si4") was used instead of Si1 and 8.9 g of polyorganosiloxane having the below structure (hereinafter "SD2") was added simultaneously together with Si4.

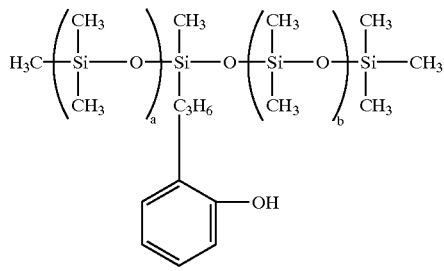

a+b≈average 79 average 1.2 phenol group per 1 molecule

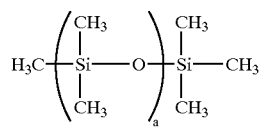

a≈average 80

The intrinsic viscosity [η] of the polymer mixture thus obtained was 0.75 dl/g.

It was confirmed that the polymer mixture was a mixture of a polycarbonate having the below structure and SD2 from infrared absorption spectrum analysis.

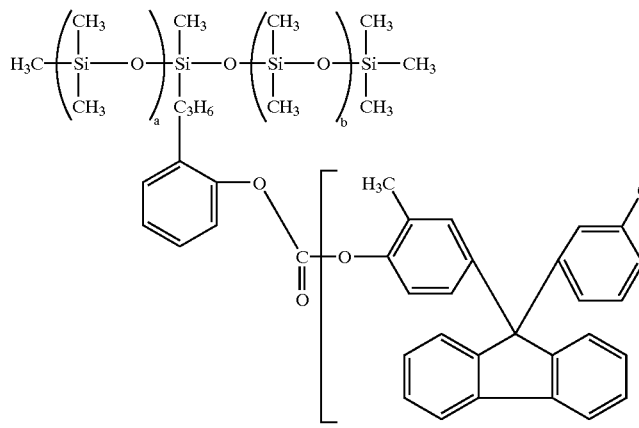

60 wt % in monomer ratio

EXAMPLE 7

The experiment was performed in the same manner as in Example 1 except that 51 g of a compound having the below structure as main component (hereinafter "Si5") was used instead of Si1 and 3.8 g of polyorganosiloxane having the below structure (hereinafter "SD3") was added simultaneously together with Si5.

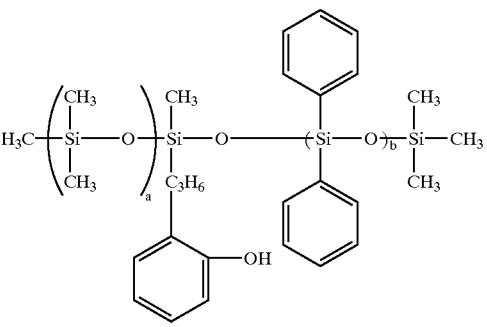

a random copolymer of a plural block of dimethylsiloxane unit and diphenylsiloxane unit at a: avarage 26 and b:average 13 a+b≈average 39 average 1.2 phenol group per 1 molecule

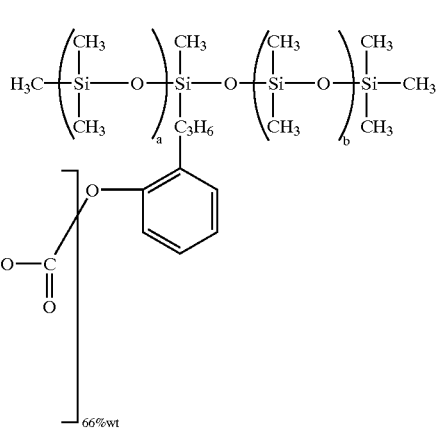

-continued

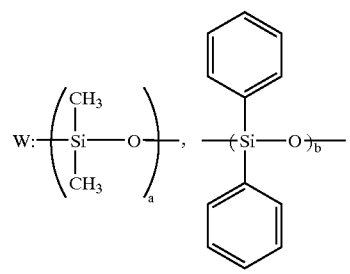

a random copolymer of a plural block of dimethylsiloxane unit and diphenylsiloxane unit at a: avarage 26 and b: average 13

The intrinsic viscosity [η] of the polymer mixture thus obtained was 0.39 dl/g,

It was confirmed that the polymer mixture was a mixture of a polycarbonate having the below structure and SD3 from infrared absorption spectrum analysis.

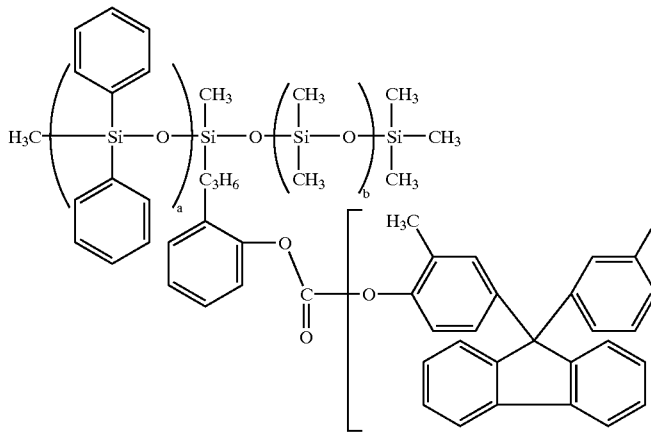

60 (wt %) in monomer ratio

Comparative Example 1

The same molding and evaluation as in Example 1 were performed using commercial 2,2-bis(4-hyroxyphenyl) propane (BPA) type polycarbonate resin (intrinsic viscosity: 0.49 dl/g), manufactured by Mitsubishi Gas Chemical Co, Inc., IUPILON S-3000 instead of the polycarbonate in Example 1.

When a THF 15 w/v % solution of the polycarbonate was prepared, white turbidity occurred and much polycarbonate not to be dissolved was present, so that a cast film could not be prepared.

Comparative Example 2

The same molding and evaluation as in Example 1 were performed adding 6.3 wt % (BPA monomer conversion: 7 wt %) of polyorganosiloxane (SD2) to commercial IUPILON S-3000 instead of the polycarbonate in Example 1.

When a THF 15 w/v % solution of the polycarbonate was prepared, white turbidity occurred and much polycarbonate not to be dissolved was present, so that a cast film could not be prepared. Further, immediately when abrasion resistance test was started for an extruded film molded article after weather resistance test, crack occurred, so that it was impossible to measure abrasion resistance.

Comparative Example 3

The experiment was performed in the same manner as in Example 1 except that the amount of phosgene was changed to 50 g and 51 g of BPA was used instead of Si1 and BPA was added simultaneously together with BCFL and 2.0 g of PTBP was added after the completion of injection of phosgene.

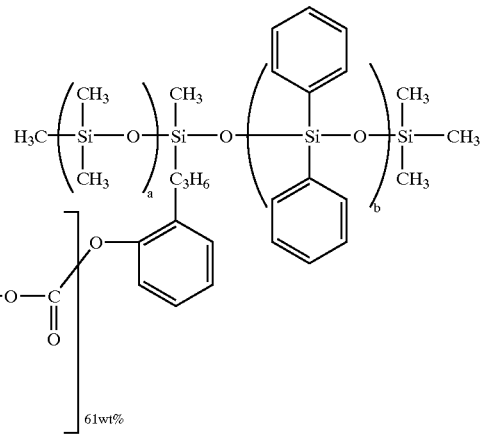

The intrinsic viscosity [η] of the polymer thus obtained was 0.46 dl/g.

It was confirmed that the polymer was a polycarbonate having the below structure from infrared absorption spectrum analysis.

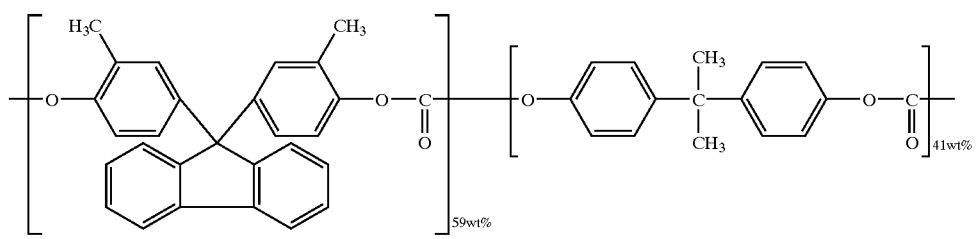

60:40(wt %) in monomer ratio

Comparative Example 4

The experiment was performed in the same manner as in Example 1 except that 51 g of α, ω-bis[3-(o-hyroxyphenyl)propyl]polydimethylsiloxane (hereinafter "SC1") was used instead of Si1 and 0.7 g of PTBP was added after the completion of injection of phosgene.

The intrinsic viscosity [η] of the polymer thus obtained was 0.45 dl/g.

It was confirmed that the polymer was a polycarbonate having the below structure as main component from infrared absorption spectrum analysis.

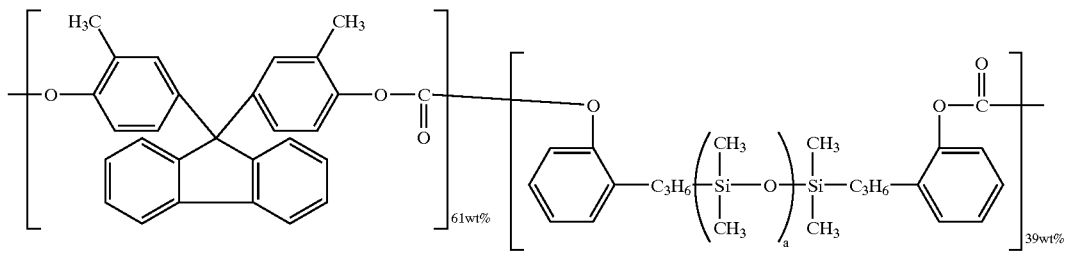

60:40(wt %) in monomer ratio

Comparative Example 5

The experiment was performed in the same manner as in Example 1 except that the amount of BCFL was changed to 51 g and the amount of Si1 was changed to 76 g.

The intrinsic viscosity [η] of the polymer thus obtained was 0.30 dl/g.

It was confirmed that the polymer was a polycarbonate having the same structure as in Example 1 except the polymerization ratio from infrared absorption spectrum analysis.

When an extruded film was prepared in the same manner as in Example 1, a good molded article could not be obtained since it was soft and foaming occurred in an extruder.

Comparative Example 6

The experiment was performed in the same manner as in Example 1 except that 76 g of BPA was used instead of BCFL.

The intrinsic viscosity [η] of the polymer thus obtained was 0.70 dl/g.

It was confirmed that the polymer was a polycarbonate having the below structure as main component from infrared absorption spectrum analysis.

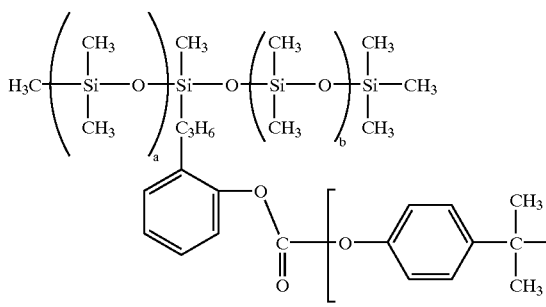

60 (wt %) in monomer ratio

When a THF 15 w/v % solution of the polycarbonate was prepared in the same manner as in Example 1, a slightly transparent gel like substance remained, so that a good cast film could not be prepared.

Comparative Example 7

The experiment was performed in the same manner as in Example 1 except that only 76 g of BCFL was used without using Si1 and 0.6 g of PTBP was added after the completion of injection of phosgene.

The intrinsic viscosity [η] of the polymer thus obtained was 0.43 dl/g.

It was confirmed that the polymer was a polycarbonate having the below structure from infrared absorption spectrum analysis.

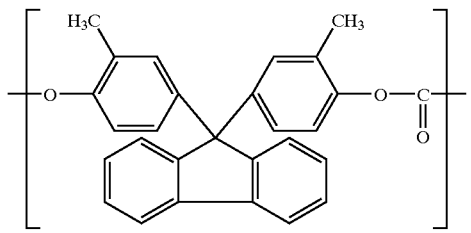

Although a rolled film was tried to be prepared in the same manner as in Example 1, the polymer was not molten at 320° C., so that an extruded film could not be obtained,

Comparative Example 8

The experiment was performed in the same manner as in Example 1 except that 76 g of Si1 was used instead of BCFL and the amount of phosgene was changed to 5 g and Si1 was not used after the completion of injection of phosgene.

The polymer thus obtained was liquid and the intrinsic viscosity [η] of the polymer was 0.13 dl/g.

It was confirmed that the polymer was a polycarbonate having the below structure as main component from infrared absorption spectrum analysis.

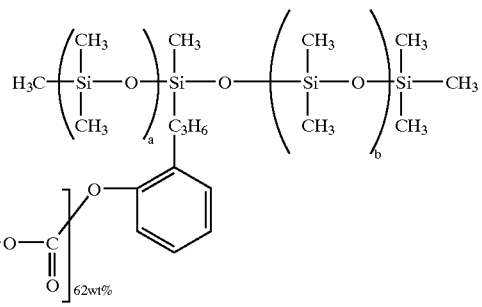

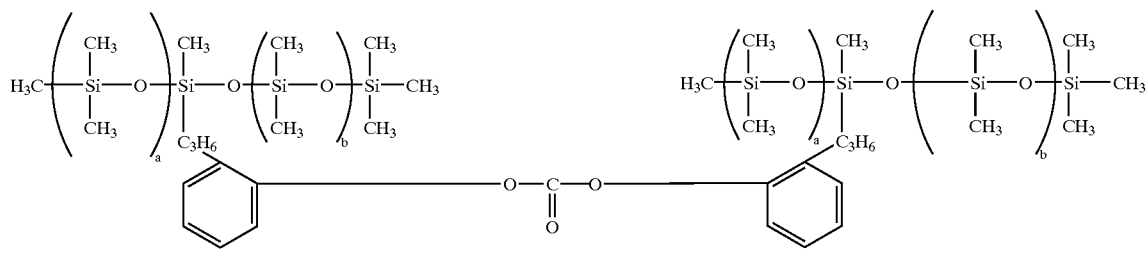

Molded articles such as in Example 1 could not be obtained since the polymer was liquid.

Components and abrasion resistance test results were shown in Table 1.

According to the present invention, a polycarbonate resin with good moldability and good transparency and furthermore excellent abrasion resistance and excellent weather resistance can be provided. The polycarbonate resin is applicable to uses of general molding of various materials such as medical instrument parts, food vessels, drinking bottles, gas permeation membrane, binders for dye and pigment, toys, materials for window and building, safeguarding materials, office automation apparatuses and portable telephones and boxes, and particularly, suitable to the production of optical articles such as optical discs including compact disc, laser disc, optical card, magneto optical disc, digital versatile disc and near field recording optical disc, optical lenses including pick-up lens, spectacle lens and camera lens, optical films and optical sheets including cover layer for near field recording medium and optical filter, optical information transmission media including optical fiber and optical waveguide and photoconductive boards and furthermore useful as various polymer alloys and additives thereof since it has good compatibility with conventional polycarbonate resins.

TABLE 1

| Example & Comparative Example | (A) copolymerization ratio (wt %) | (B) copolymerization ratio (wt %) | (C) copolymerization ratio (wt %) | (D) blending ratio (wt %) | Intrinsic viscosity (dl/g) | Cast film (THF solution) before abrasion resistance test abrasion loss (mg) | Cast film (THF solution) after abrasion resistance test abrasion loss (mg) | Extruded film before abrasion resistance test abrasion loss (mg) | Extruded film after abrasion resistance test abrasion loss (mg) |
|---|---|---|---|---|---|---|---|---|---|
| Example 1 | 60 | Si1 40 | — | — | 0.45 | 15 | 19 | 21 | 25 |
| Example 2 | 60 | Si2 40 | — | — | 0.58 | 17 | 21 | 23 | 28 |
| Example 3 | 60 | Si3 40 | — | — | 0.54 | 16 | 20 | 23 | 28 |
| Example 4 | 50 | Si1 30 | BPA 20 | — | 0.44 | 21 | 26 | 24 | 27 |
| Example 5 | 70 | Si1 30 | — | SD1 3 | 0.53 | 13 | 16 | 22 | 26 |
| Example 6 | 65 | Si4 35 | — | SD2 7 | 0.75 | 13 | 16 | 21 | 25 |
| Example 7 | 60 | Si5 40 | — | SD3 3 | 0.39 | 14 | 16 | 20 | 24 |
| Comp.Ex. 1 | — | — | BPA 100 | — | 0.49 | *1 | *1 | 35 | 46 |
| Comp.Ex. 2 | — | — | BPA 100 | SD2 7 | 0.49 | *1 | *1 | 51 | crack |
| Comp.Ex. 3 | 60 | — | BPA 40 | — | 0.46 | 21 | 33 | 37 | crack |
| Comp.Ex. 4 | 60 | — | SC1 40 | — | 0.45 | 20 | 31 | 25 | 34 |
| Comp.Ex. 5 | 40 | Si1 60 | — | — | 0.30 | 34 | 43 | 48 | 61 |
| Comp.Ex. 6 | — | Si1 40 | BPA 60 | — | 0.70 | *2 | *2 | 29 | 37 |
| Comp.Ex. 7 | 100 | — | — | — | 0.43 | 27 | 35 | *3 | *3 |
| Comp.Ex. 8 | — | Si1 100 | — | — | 0.13 | liquid | liquid | liquid | liquid |

Note *1: undissolved
*2: failure of film formation
*3: failure of molding
(A) copolymerization ratio: a weight ratio of the compound of (A) to total amount of the compound of (A), the compound of (B) and the compound of (C)
(B) copolymerization ratio: a weight ratio of the compound of (B) to total amount of the compound of (A), the compound of (B) and the compound of (C)
(C) copolymerization ratio: a weight ratio of the compound of (C) to total amount of the compound of (A), the compound of (B) and the compound of (C)
(D) blending ratio: an amount (wt %) of the compound of (D) to be added to total amount of the compound of (A), the compound of (B) and the compound of (C)

What is claimed is:

1. A polycarbonate resin obtained by reaction of a compound represented by the following general formula (A) and a compound represented by the following general formula (B) or a compound represented by the general formula (A), a compound represented by the formula (B) and a compound represented by the following general formula (C) with a carbonic acid ester-forming compound, wherein an amount of a compound represented by the general formula (B) is 10 to 50% by weight to total amount of a compound represented by the general formula (A), a compound represented by the general formula (B) and a compound represented by the general formula (C) and an intrinsic viscosity [η] of said polycarbonate resin is 0.2 to 2.0 dl/g;

(A)

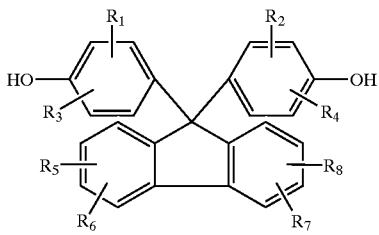

wherein $R_1$, $R_2$, $R_3$, $R_4$, $R_5$, $R_6$, $R_7$ and $R_8$ are, each independently, a hydrogen atom, an alkyl group having 1 to 5 carbon atoms, an aryl group having 6 to 12 carbon atoms, an alkenyl group having 2 to 5 carbon atoms, an alkoxy group having 1 to 5 carbon atoms or an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s);

(B)

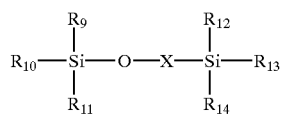

wherein $R_9$, $R_{10}$, $R_{11}$, $R_{12}$, $R_{13}$ and $R_{14}$ are, each independently, a hydrogen atom, an alkyl group having 1 to 5 carbon atoms, an aryl group having 6 to 12 carbon atoms, an alkenyl group having 2 to 5 carbon atoms, an alkoxy group having 1 to 5 carbon atoms or an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s); X is a homopolymer or a random copolymer of —SiO($R_{15}$)($R_{16}$)— and/or —SiO($R_{17}$)($R_{18}$)— having an average polymerization degree of 3 to 200; $R_{15}$, $R_{16}$, $R_{17}$ and $R_{18}$ are, each independently, a hydrogen atom, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms or an organic group (M) having an hyroxyphenyl group and when said group has carbon atom, said group can have an alkyl group having 1 to 5 carbon atoms, an alkenyl group having 2 to 5 carbon atoms or an alkoxy group having 1 to 5 carbon atoms as a substituent(s) and average 1 to 3 organic group (M) having an hyroxyphenyl group is (are) indispensably contained in $R_{15}$, $R_{16}$, $R_{17}$ and $R_{18}$;

(C)

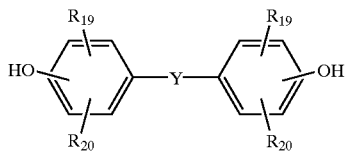

wherein $R_{19}$ and $R_{20}$ are, each independently, a hydrogen atom, a fluorine atom, a chlorine atom, a bromine atom, an alkyl group having 1 to 10 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms or a group forming a carbon ring or a heterocycle in optional combination of $R_{19}$ and $R_{20}$ and when said group has carbon atom, said group can have a fluorine atom, a chlorine atom, a bromine atom, an alkyl group having 1 to 5 carbon atoms, an alkenyl group having 2 to 5 carbon atoms or an alkoxy group having 1 to 5 carbon atoms as a substituent(s) and Y is;

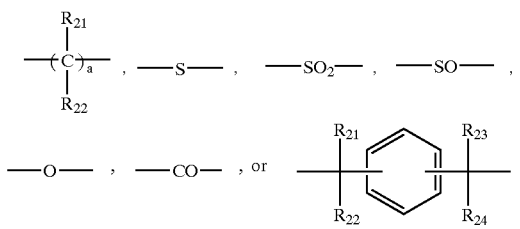

wherein $R_{21}$, $R_{22}$, $R_{23}$ and $R_{24}$ are, each independently, a hydrogen atom, a fluorine atom, a chlorine atom, a bromine atom, an alkyl group having 1 to 10 carbon atoms, an alkenyl group having 2 to 5 carbon atoms, an alkoxy group having 1 to 5 carbon atoms, an aryl group having 6 to 12 carbon atoms, a carbon ring having 3 to 6 carbon atoms or a heterocycle having 3 to 6 carbon atoms in optional combination of $R_{21}$, $R_{22}$, $R_{23}$ and $R_{24}$ and when said group has carbon atom, said group can have a fluorine atom, a chlorine atom, a bromine atom, an alkyl group having 1 to 5 carbon atoms, an alkenyl group having 2 to 5 carbon atoms or an alkoxy group having 1 to 5 carbon atoms as a substituent(s) and a is an integer of 0 to 20.

2. A polycarbonate resin according to claim 1, wherein said compound represented by the general formula (A) is at least one selected from the group consisting of 9,9-bis(4-hydroxyphenyl) fluorene, 9,9-bis(4-hydroxy-3-methylphenyl) fluorene and 9,9-bis(4-hydroxy-2-methylphenyl) fluorene.

3. A polycarbonate resin according to claim 1, wherein said carbonic acid ester-forming compound is phosgene.

4. A polycarbonate resin according to claim 1, wherein each said $R_{15}$, $R_{16}$, $R_{17}$ and $R_{18}$ in the compound represented by the general formula (B) are at least one group selected from the group consisting of methyl group and phenyl group.

5. A polycarbonate resin according to claim 1, wherein said compound represented by the general formula (C) is 2,2-bis(4-hydroxyphenyl)propane.

6. A polycarbonate resin according to claim 1, wherein a weight ratio of an amount of said compound represented by the general formula (C) to total amount of said compound represented by the general formula (A) and said compound represented by the general formula (C) is 0.5 or below.

7. A polycarbonate resin composition comprising of a mixture of the polycarbonate resin described in claim 1 and a polyorganosiloxane.

8. A polycarbonate resin composition according to claim 7, wherein said polyorganosiloxane is a compound represented by the following general formula (D):

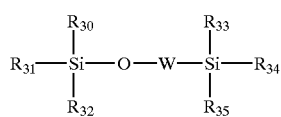

wherein $R_{30}$, $R_{31}$, $R_{32}$, $R_{33}$, $R_{34}$ and $R_{35}$ are, each independently, a hydrogen atom, an alkyl group having 1 to 5 carbon atoms, an aryl group having 6 to 12 carbon atoms, an alkenyl group having 2 to 5 carbon atoms, an alkoxy group having 1 to 5 carbon atoms or an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s); W is a homopolyer or a random copolymer of —$SiO(R_{36})(R_{37})$— and/or —$SiO(R_{38})(R_{39})$— having an average polymerization degree of 3 to 200; $R_{36}$, $R_{37}$, $R_{38}$ and $R_{39}$ are, each independently, a hydrogen atom, an alkyl group having 1 to 5 carbon atoms, an aryl group having 6 to 12 carbon atoms, an alkenyl group having 2 to 5 carbon atoms, an alkoxy group having 1 to 5 carbon atoms or an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s).

9. A polycarbonate resin composition according to claim 7, wherein a blending amount of said polyorganosiloxane to an amount of the polycarbonate resin described in claim 1 is 0.1 to 30% by weight.

* * * * *